Patented Aug. 7, 1923.

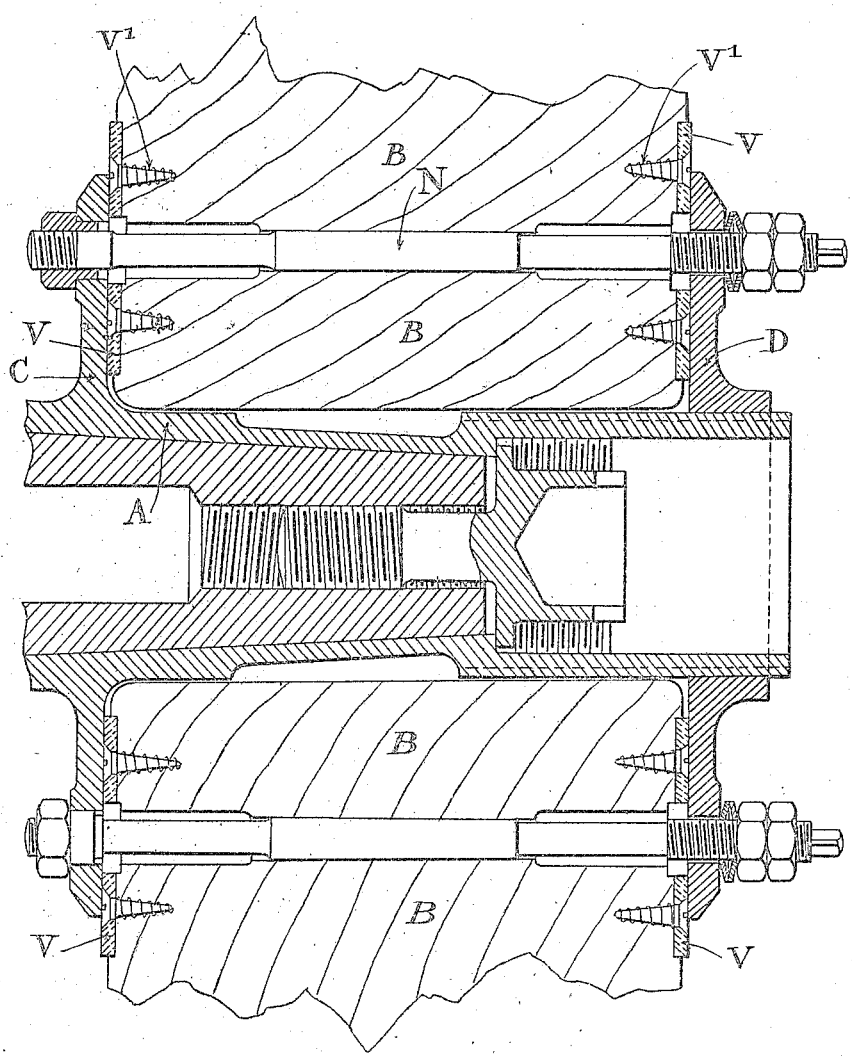

1,463,838

UNITED STATES PATENT OFFICE.

PIERRE JEAN RENÉ POSTEL-VINAY, OF PARIS, FRANCE, ASSIGNOR TO SOCIETE DES MOTEURS SALMSON (SYSTEME CANTON-UNNE), OF PARIS, FRANCE.

MEANS FOR SECURING ROTARY MEMBERS OF CONTRACTILE MATERIAL TO METALLIC HUBS.

Application filed March 16, 1921. Serial No. 452,811.

*To all whom it may concern:*

Be it known that I, PIERRE JEAN RENÉ POSTEL-VINAY, citizen of the French Republic, residing at Paris, in the Republic of France, have invented new and useful Improvements in Means for Securing Rotary Members of Contractile Material to Metallic Hubs, of which the following is a specification.

This invention relates to an improvement in the device described in my U. S. Patent No. 1.354.842 dated October 5, 1920 and consists essentially in inserting between the wood of the propeller and the iron of the hub, discs secured to the propeller and made of metal or other friction material which will withstand heat, in such manner that the elastic fastening device not only provides for the clamping of the propeller in the metal hub in spite of any shrinkage of the wood and affords the entraining as previously carried out, but will also have a braking action, by friction against the propeller, upon oscillations, vibrations or resonance effects of the driving shaft which might produce abnormal effects, this energy due to braking being absorbed by the above mentioned discs.

The accompanying drawing shows by way of example and in axial section a fastening device constructed in accordance with the present invention.

As shown in the drawing, the metal hub comprises the sleeve like body A provided with the integral flange C, and carrying the removable flange D. The propeller or like member B made of wood or other contractile material is clamped between the flanges C and D by means of the bolts N as described in my prior patent above referred to.

According to my present invention, plates or discs V are inserted between the side faces of the propeller B on the one hand and the flanges C and D on the other hand, said plates are secured to the propeller for instance by screws $V^1$ and are intended to absorb by friction against the flange the energy developed by any possible abnormal oscillations. These discs or plates V may be of metal or other material affording friction and able to withstand heat. The bolts N extend through apertures provided in plates V, the diameter of said apertures affording a wide play around the bolts, in order to permit a free bending of the latter.

Having now described my said invention, what I claim as new and desire to be secured by Letters Patent is:

In combination, a rotary driving member, a metallic flange rigidly mounted upon said member, another metallic flange slidably mounted upon said member and adapted to rotate therewith, a driven member of contractile material mounted on said driving member between the two flanges, holes extending longitudinally through said driven member and flanges, bolts in said holes with nuts on said bolts adapted to tighten the driven member between the two flanges, said holes and bolts contacting only along an intermediate portion, plates disposed on the side faces of the driven member and adapted to contact with the said flanges, said plates being made of a friction material adapted to withstand heat, separate means for rigidly securing said plates to the driven member and apertures in said plates in alignment with said holes, said bolts extending through said apertures with a wide play.

In testimony whereof I have signed my name to this specification.

PIERRE JEAN RENÉ POSTEL-VINAY.